US012749331B2

(12) United States Patent
Zhou et al.

(10) Patent No.: US 12,749,331 B2
(45) Date of Patent: Sep. 29, 2026

(54) METHOD, DEVICE AND STORAGE MEDIUM FOR RECOGNIZING CHART

(71) Applicant: Orka Health Co., Ltd., Shanghai (CN)

(72) Inventors: Haoshuai Zhou, Shanghai (CN); Congxi Lu, Shanghai (CN); Linkai Li, Shanghai (CN); Yufan Yuan, Shanghai (CN); Hongcheng Sun, Shanghai (CN)

(73) Assignee: EVOCO LABS CO., LTD., Shanghai (CN)

( * ) Notice: Subject to any disclaimer, the term of this patent is extended or adjusted under 35 U.S.C. 154(b) by 276 days.

(21) Appl. No.: 18/566,107

(22) PCT Filed: May 23, 2022

(86) PCT No.: PCT/CN2022/094420

§ 371 (c)(1),
(2) Date: Dec. 1, 2023

(87) PCT Pub. No.: WO2022/253024

PCT Pub. Date: Dec. 8, 2022

(65) Prior Publication Data

US 2024/0265722 A1 Aug. 8, 2024

(30) Foreign Application Priority Data

Jun. 2, 2021 (CN) ......................... 202110614188.9

(51) Int. Cl.
*G06V 30/42* (2022.01)
*G06V 10/24* (2022.01)
(Continued)

(52) U.S. Cl.
CPC ............ *G06V 30/42* (2022.01); *G06V 10/242* (2022.01); *G06V 10/766* (2022.01); *G06V 10/82* (2022.01); *G06V 30/416* (2022.01)

(58) Field of Classification Search
CPC ...... G06V 30/42; G06V 30/146; G06V 10/82; G06V 10/242; G06V 10/766
See application file for complete search history.

(56) References Cited

U.S. PATENT DOCUMENTS 11,170,034 B1 * 11/2021 Huang .................. G06F 16/353
11,308,667 B1 * 4/2022 Silverstein ............ G06T 11/206
(Continued)

FOREIGN PATENT DOCUMENTS

CN 108319490 A 7/2018
CN 109189997 A 1/2019
(Continued)

OTHER PUBLICATIONS

International Search Report of PCT/CN2022/094420 mailed on Aug. 24, 2022.

*Primary Examiner* — Dave Czekaj
(74) *Attorney, Agent, or Firm* — Junhe Law Office P.C.; Zhaohui Wang

(57) ABSTRACT

A method for identifying a chart comprises: acquiring an object image containing the chart, wherein the chart comprises a labeled area defined by a first coordinate axis and a second coordinate axis that intersect with each other, first coordinate labels along the first coordinate axis, second coordinate labels along the second coordinate axis, and a plurality of characteristic labels within the labeled area; processing the object image with a trained neural network to identify and separate the chart from the object image; processing the chart with a trained neural network to identify the first coordinate labels, the second coordinate labels, and the plurality of characteristic labels; generating a chart coordinate system based on the identified first coordinate labels and second coordinate labels, wherein the chart coordinate system fits the first coordinate axis and the second coordinate axis of the object image; determining coordinate
(Continued)

values of each of the plurality of characteristic labels based on an identified position of the characteristic label in the chart coordinate system.

16 Claims, 9 Drawing Sheets

(51) Int. Cl.

| | |
|---|---|
| ***G06V 10/766*** | (2022.01) |
| ***G06V 10/82*** | (2022.01) |
| ***G06V 30/416*** | (2022.01) |

(56) References Cited

U.S. PATENT DOCUMENTS

| | | | | |
|---|---|---|---|---|
| 2019/0163970 | A1 | 5/2019 | Yu et al. | |
| 2021/0125034 | A1* | 4/2021 | Nguyen ................. | G06N 3/044 |

FOREIGN PATENT DOCUMENTS

| | | | |
|---|---|---|---|
| CN | 109359560 | A | 2/2019 |
| CN | 111831771 | A | 10/2020 |
| CN | 111950528 | A | 11/2020 |
| CN | 112651315 | A | 4/2021 |
| CN | 113313038 | A | 8/2021 |

* cited by examiner

METHOD, DEVICE AND STORAGE MEDIUM FOR RECOGNIZING CHART

FIELD OF THE INVENTION

The present invention generally relates to a chart processing technology, and more specifically, to a method, device and storage medium for recognizing charts.

BACKGROUND OF THE INVENTION

For patients with hearing loss, the most basic and commonly used test item in clinical hearing clinics is pure tone hearing threshold tests, and the test results are generally represented by audiograms. Based on the test results presented by the audiograms, whether the patient's hearing has deteriorated, and the extent of deterioration can be accurately assessed.

Pure tone refers to the sound with a single frequency component, such as 500 Hz single frequency tone, 1000 Hz single frequency tone, etc.; and hearing threshold refers to the minimum loudness of sound that patients can perceive subjectively during the test at a ratio greater than 50%, which can be 30 dB, 40 dB, etc. At the same time, because sound can be transmitted through air conduction and bone conduction, audiograms sometimes include test results under air conduction and bone conduction, but most of them are mainly obtained under air conduction. Air conduction is the conduction of sound through air, passing through the auricle, external auditory canal, tympanic membrane, ossicular chain to the oval window, and then into the inner ear. Bone conduction is the direct effect of sound on the skull to the inner ear.

A standard audiogram usually contains an abscissa representing sound frequency and an ordinate representing loudness of sound. The abscissa usually contains a plurality of sound frequency coordinate axis labels each assigned with a fixed hertz number, and the ordinate usually contains a plurality of loudness of sound coordinate axis labels each assigned with a fixed decibel number. Audiograms generally contain one, two or four curves. In most cases, the audiogram may contain two curves, namely a left ear air conduction curve and a right ear air conduction curve. When the audiogram contains four curves, the four curves are air conduction curves for the left and right ears as well as bone conduction curves for the left and right ears. Each air conduction or bone conduction curve includes a plurality of characteristic labels, and the color and shape of the characteristic labels indicate different detection types. Under standard conditions, blue represents left ear, red represents right ear, "O" represents right ear air conduction, "X" represents left ear air conduction, "<" represents right ear bone conduction, and ">" represents left ear bone conduction.

FIG. 1 shows an exemplary audiogram 10. As shown in FIG. 1, the abscissa of the audiogram represents sound frequency, and the ordinate represents loudness of sound. The audiogram specifically contains two air conduction curves, where a curve 12 connecting labels "X" represents a left ear air conduction curve, and each of the labels "X" represents a hearing level/loss value of the left ear air conduction at different frequencies; a curve 14 connecting labels "O" represents a right ear air conduction curve, and each label "O" represents a hearing level/loss value of the right ear air conduction at different frequencies. For example, thresholds of the hearing loss of the right ear are 15 dB at 250 Hz, 20 dB at 500 Hz, 25 dB at 1000 Hz, 40 dB at 2000 Hz, 50 dB at 3000 Hz, 65 dB at 4000 Hz, 80 dB at 6000 Hz, and 75 dB at 8000 Hz; thresholds of the hearing loss of the left ear are 20 dB at 250 Hz, 20 dB at 500 Hz, 20 dB at 1000 Hz, 35 dB at 2000 Hz, 40 dB at 3000 Hz, 70 dB at 4000 Hz, 80 dB at 6000 Hz, and 80 dB at 8000 Hz.

Audiograms are usually used by physicians or audiologists to provide patients with hearing aids that are suitable for them. When the physicians or audiologists obtain the patient's audiograms, they may need to read characteristic label values on curves in the audiograms by themselves, and then manually input them into a fitting software of hearing aids from different manufacturers to obtain the parameters or values of the hearing aids. The obtained parameters can be written into the hearing aids to configure the hearing aids. This process is cumbersome. Sometimes the labels are difficult to distinguish because they are overlapping with each other or black-and-white colored. The process of recognizing images is slow and error-prone. It can be seen from FIG. 1 that the labels on the audiogram may overlap with each other, so the recognizing of values may be affected, and the indistinguishable labels would cause manual readings to be slow and error-prone.

Therefore, it is desired to provide an improved method and device for recognizing audiograms.

SUMMARY OF THE INVENTION

An objective of the present application is to provide a method and a device for recognizing charts, especially audiograms, to solve the problem of manual reading of charts that is error-prone, time-consuming and labor-intensive.

In one aspect of the present application, a method for recognizing a chart is provided, wherein the method comprises: acquiring an object image containing a chart, wherein the chart comprises a labeled area defined by a first coordinate axis and a second coordinate axis that intersect with each other, first coordinate labels along the first coordinate axis, second coordinate labels along the second coordinate axis, and a plurality of characteristic labels within the labeled area; processing the object image with a trained first neural network to identify and separate the chart from the object image; processing the chart with a trained second neural network to identify the first coordinate labels, the second coordinate labels and the plurality of characteristic labels; generating a chart coordinate system based on the identified first coordinate labels and second coordinate labels, wherein the chart coordinate system fits the first coordinate axis and the second coordinate axis of the object image; and determining coordinate values of each of the plurality of characteristic labels based on an identified position of the characteristic label in the chart coordinate system.

In some embodiments, after the step of processing the object image with the trained first neural network, the method further comprises: rotating the chart to extend the first coordinate axis generally in a horizontal direction and the second coordinate axis generally in a vertical direction.

In some embodiments, the step of rotating the chart further comprises: determining a first angle to be rotated for the first coordinate axis and a second angle to be rotated for the second coordinate axis using Hough straight line transformation method; and rotating the first coordinate axis and the second coordinate axis based on the determined first and second angles to be rotated.

In some embodiments, the trained first neural network and the trained second neural network are trained with different data sets.

In some embodiments, the first neural network and the second neural network use the same neural network algorithm.

In some embodiments, the first neural network and the second neural network both use faster region based convolutional neural network (RCNN) algorithm in combination with feature pyramid network (FPN) algorithm.

In some embodiments, the second neural network is trained with a synthetized training data set, and the synthetized training data set comprises a plurality of synthetized audiograms each including a background image and coordinate labels superimposed on the background image, and wherein the coordinate labels are generated based on one or more character libraries.

In some embodiments, the synthetized audiogram further comprises interference labels superimposed on the background image.

In some embodiments, the step of generating a chart coordinate system based on the identified first coordinate labels and second coordinate labels further comprises: using Huber regression algorithm to fit the chart coordinate system to the first coordinate axis and the second coordinate axis.

In some embodiments, the step of generating a chart coordinate system based on the identified first coordinate labels and second coordinate labels further comprises: using random sample and consensus (RANSAC) algorithm to spatially fit the chart coordinate system to the first coordinate labels and to the second coordinate labels respectively; and using RANSAC algorithm to numerically fit at least a part of the first coordinate labels and to at least a part of the second coordinate labels so as to generate the first coordinate axis and the second coordinate axis.

In some embodiments, the step of determining coordinate values of each of the plurality of characteristic labels based on an identified position of the characteristic label in the chart coordinate system comprises: projecting each of the characteristic labels onto the first coordinate axis to determine a first coordinate value of the characteristic label; projecting each of the characteristic labels onto the second coordinate axis to determine a second coordinate value of the characteristic label; and combining the first coordinate value and the second coordinate value for each characteristic label.

In some embodiments, the chart is an audiogram, the first coordinate axis represents sound frequency, the second coordinate axis represents loudness of sound, the first coordinate axis labels are frequency values, and the second coordinate axis labels are loudness values, and the coordinate values of each characteristic label has a pair of frequency value and loudness value.

In some embodiments, the characteristic labels further comprise left ear characteristic labels each representing left ear hearing and right ear characteristic labels each representing right ear hearing.

In some embodiments, the characteristic labels further comprise left ear air conduction characteristic labels or left ear bone conduction characteristic labels each representing left ear hearing, and right ear air conduction characteristic labels or right ear bone conduction characteristic labels each representing right ear hearing.

In another aspect of the present application, a device for automatically recognizing a chart is also provided, wherein the device for automatically recognizing a chart comprises a non-transitory computer storage medium on which one or more executable instructions are stored, and the one or more instructions are executable by a processor to perform the steps as mentioned in above aspect.

In another aspect of the present application, a non-transitory computer storage medium is also provided, wherein one or more executable instructions are stored thereon, and the one or more instructions are executable by a processor to perform the steps as mentioned in above aspect.

The above is an overview of the present application, which may be simplified, summarized and omitted in detail. Therefore, those skilled in the art should realize that this part is only illustrative, and is not intended to limit the scope of the application in any way. This summary is neither intended to determine the key features or essential features of the subject matter sought to be protected, nor is it intended to be used as an auxiliary means to determine the scope of the subject matter sought to be protected.

BRIEF DESCRIPTION OF THE FIGURES

The above and other features of the content of the present application will be more fully understood through the following description and appended claims in combination with the drawings. It can be understood that these drawings only illustrate several implementations of the content of the present application, and therefore should not be considered as limiting the scope of the content of the present application. By adopting the drawings, the content of the present application will be explained more clearly and in detail.

Figure 1:
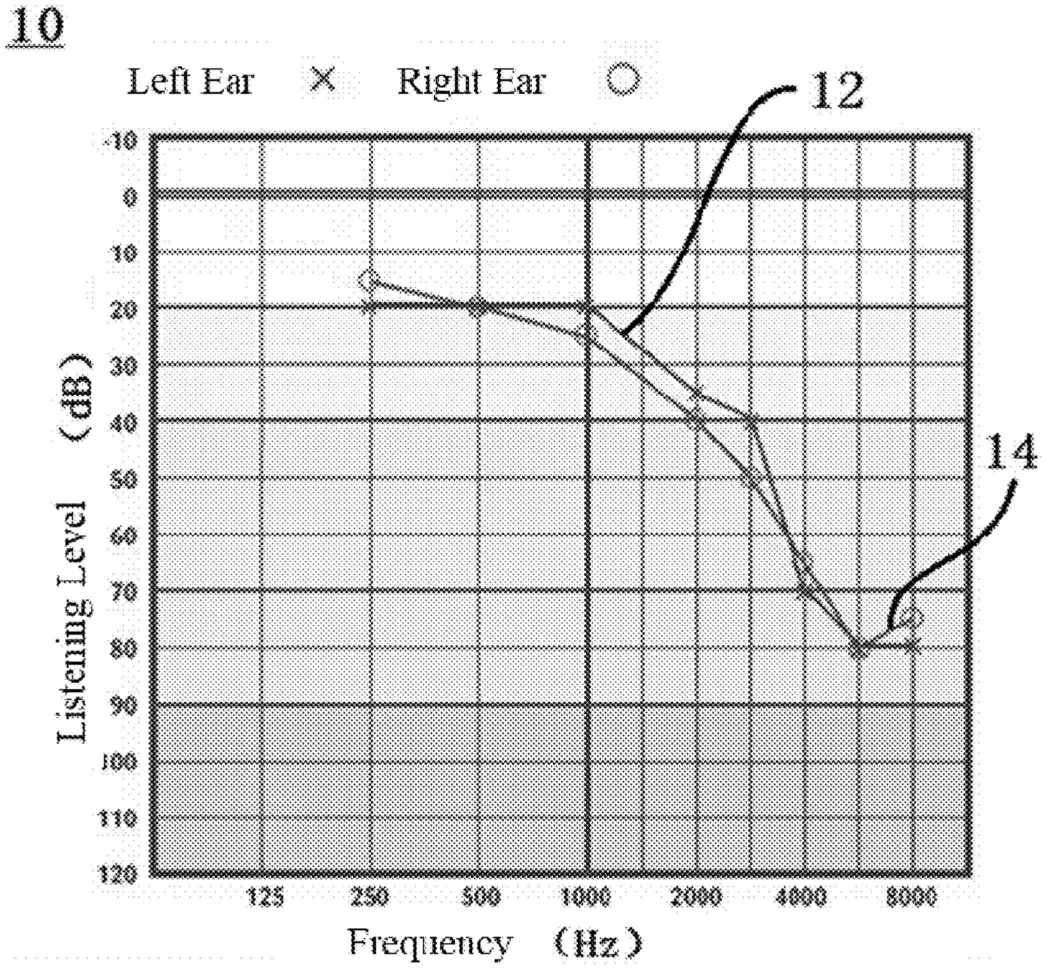
FIG. 1 shows an exemplary audiogram 10.

Before explaining any embodiments of the present invention in detail, it shall be understood that the application of the present invention is not limited to the details of the configuration and the arrangement of components set forth in the following description or shown in the following drawings.

The present invention can have other embodiments and can be practiced or implemented in various ways. Moreover, it shall be understood that the wording and terminology used herein are for illustrative purposes and shall not be considered limitative.

DETAILED DESCRIPTION OF THE INVENTION

In the following detailed description, reference is made to the drawings constituting a part thereof. In the drawings, similar symbols usually indicate similar components, unless the context specifies otherwise. The illustrative embodiments described in the detailed description, drawings, and claims are not intended to limit. Without departing from the spirit or scope of the subject matter of the present application, other embodiments may be applied, and other changes may be made. It can be understood that various aspects of the content of the present application described generally in the present application and illustrated in the drawings can be configured with various configurations, substitutions, combinations, and designs, all of which clearly constitute a part of the content of the present application.

In order to facilitate the processing of charts with standard formats such as audiograms, the inventors of the present application propose a method that uses neural network technology to process images and recognize charts in the images and values corresponding to chart labels. This processing method can effectively reduce manpower occupation and improve processing efficiency. In some embodiments, this chart processing method is executable by an electronic device with computing and data processing capabilities to realize an automated processing process.

Figure 2:
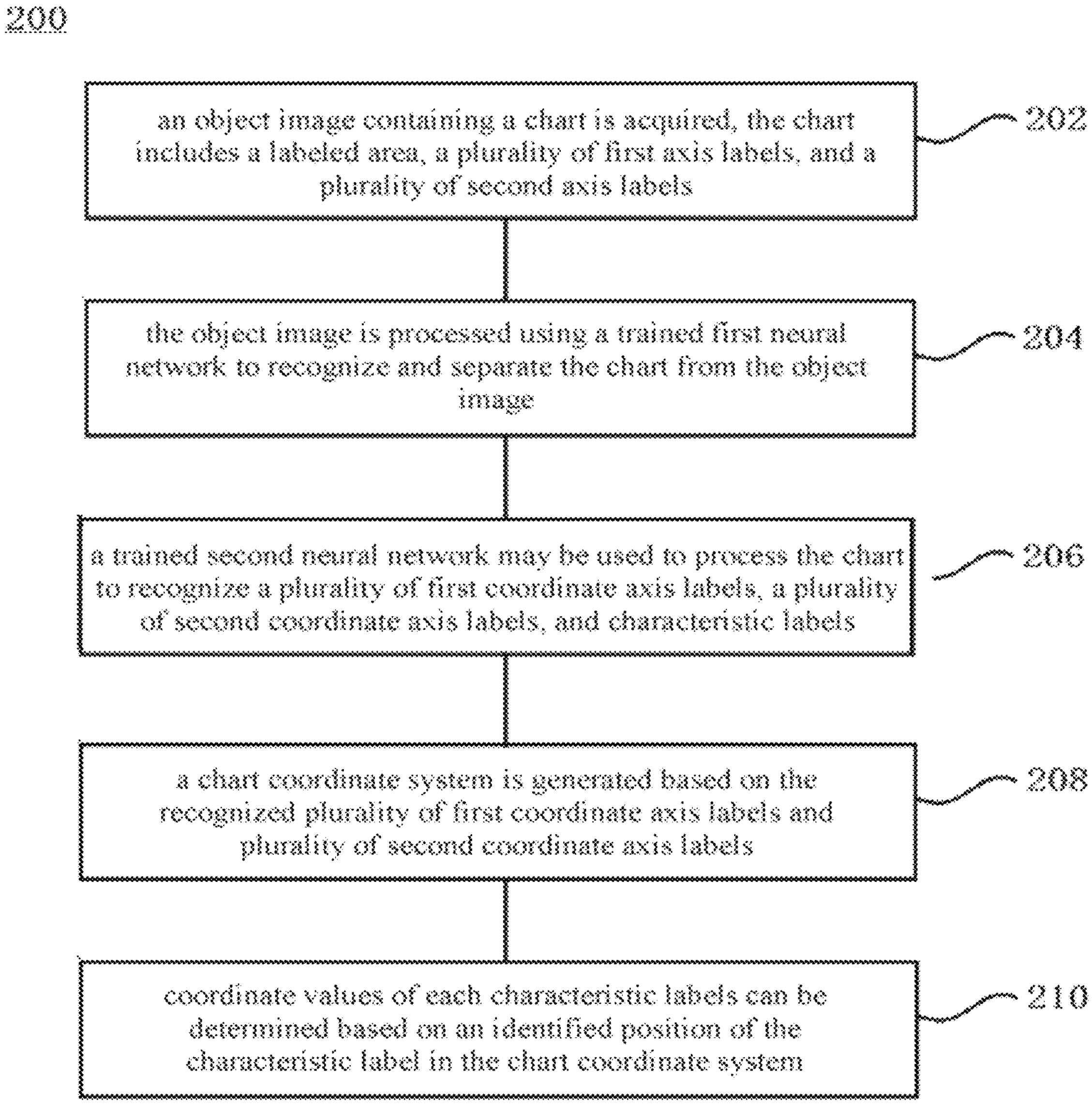
FIG. 2 shows a method for recognizing a chart according to an embodiment of the present application.

FIG. 2 shows a method 200 for recognizing a chart according to an embodiment of the present application. In some embodiments, the chart to be recognized may be, for example, the audiogram shown in FIG. 1, but those skilled in the art can understand that the protection scope of the present application is not limited to this, and other similar charts with a standard format, especially charts represented in a rectangular coordinate system (coordinate system with two mutually perpendicular coordinate axes), such as a spectrogram, can also be recognized by the method of the embodiment of the present application. In the following, an audiogram similar to that shown in FIG. 1 is used as an example to describe the method for recognizing a chart of the present application.

Figure 3:
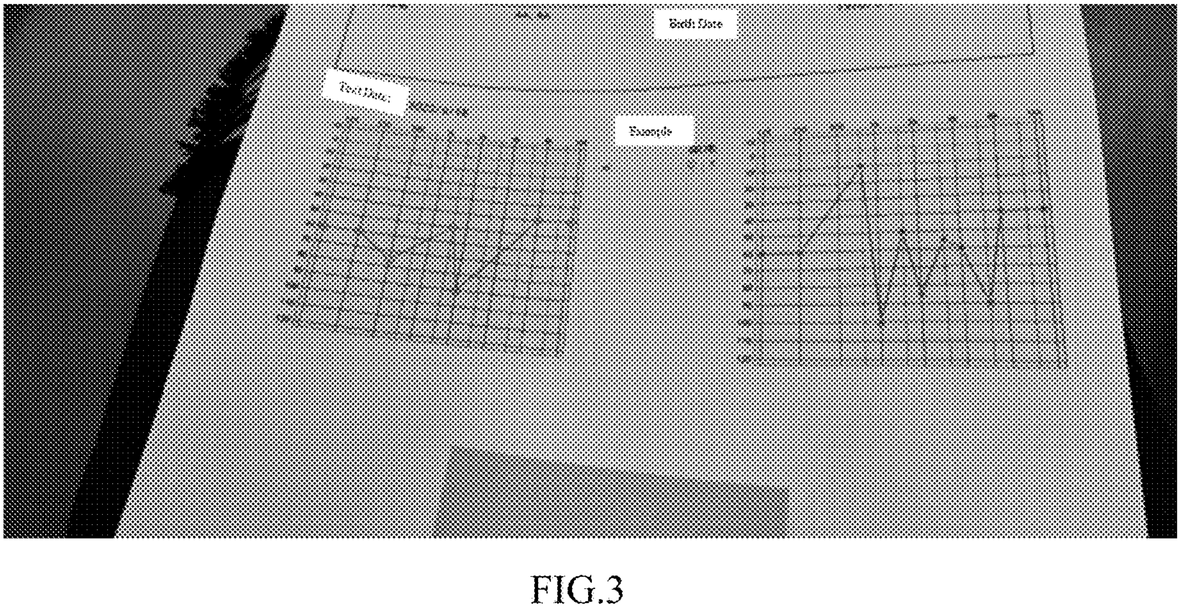
FIG. 3 shows an exemplary object image.

As shown in FIG. 2, in step 202, an object image containing a chart is acquired. FIG. 3 shows an exemplary object image. As shown in FIG. 3, the object image is a white paper photo with two audiograms printed thereon. In practical applications, the photo shown in FIG. 3 usually needs to be printed. For example, a patient takes to the hearing aid manufacturer or business the photo or an electronic scan of the printed report of the audiogram measured in the hospital so that the patient can get a suitable hearing aid for himself or herself. It can be seen from FIG. 3 that the chart to be processed and recognized exists in the object image as a part of it. The object image may also contain other graphics, text or numbers, such as the patient's personal information displayed on the top of the object image shown in FIG. 3. In addition, the object image may also contain the background of the photo, such as gray and black shadows on both sides of the photo shown in FIG. 3. In some embodiments, the object image may, for example, be electronically inputted or transmitted to an electronic device executing the method 200 through communication software such as email, remote storage software such as network hard disk, or through hardware storage media such as mobile hard disks or USB flash drives. It can be understood that the present application does not specifically limit the format of the object image.

Next, in step 204, the object image is processed using a trained first neural network to recognize and separate the chart from the object image.

As mentioned above, the object image may have text, image or other background irrelevant to the chart, and the irrelevant information may affect the recognition of the chart. Ideally, step 204 may not be performed and the object image may be directly recognized to obtain the audiogram. However, since the audiogram only occupies a part or even a small part of the entire object image, directly performing subsequent processing steps would greatly reduce accuracy. Moreover, in some cases, the object image may contain a plurality of audiograms, and skipping step 204 would also make subsequent processing very complicated. Therefore, in order to better perform subsequent recognition of the content in the chart, the object image can be processed first to extract the chart from an area where it is located.

In order to improve the accuracy of extracting the chart, the embodiments of the present application use neural network technology to process the object image. In some embodiments, the first neural network for recognizing the chart may use the Faster-RCNN (Faster Region Based Convolutional Neural Network) neural network model commonly used in target detection. In the process of extracting the chart from the object image, the detection target for the first neural network is a chart similar to an audiogram. It can be understood that the first neural network may be pre-trained from a data set including similar object images and audiograms, so that it can recognize audiograms in a targeted manner. For example, the first neural network can be trained by giving some images with annotated audiogram locations. During training and testing, the audiogram is regarded as the only category of foreground, and all other areas are regarded as background for training and testing.

The first neural network first performs characteristic extraction on the acquired object image through a plurality of convolutional layers, and extracts a characteristic diagram of the entire image. In some embodiments, the first neural network using the Faster RCNN model is mainly composed of two parts, i.e., a first part which is RPN (Region Proposal Network), and a second part which is Fast RCNN. The RPN is mainly used to extract candidate frames, while the Fast RCNN corrects and classifies candidate frames on the extracted candidate frames. Compared with a single stage detection algorithm (such as the YOLO algorithm, etc.), although the processing speed of Faster RCNN is slower, its accuracy is higher, and it is especially suitable for detecting small targets.

The first neural network also uses a pyramid network (FPN) model. FPN is a method that can efficiently extract characteristics of various dimensions in an object image. The FPN fuses the characteristic diagrams of different levels in the convolutional neural network, so that the final fused characteristic diagram has both high-level and summative information as well as low-level and more fine-grained information. Since the FPN can effectively improve the detection accuracy, the Faster-RCNN and FPN models are both used in the first neural network used in step 204.

It can be understood that although the Faster-RCNN model is adopted as a whole in the first neural network model, some parts of the model can be replaced with algorithms or models that can achieve the same function. For example, the classification structure can be replaced by a support vector machine (SVM). In addition, other common target detection models such as Fast-RCNN and YOLO can be used. Moreover, in this type of target detection model neural network architecture, the characteristic FPN model can be combined with the Faster-RCNN model to fuse the high-resolution information of the low-level characteristics and the high-semantic information of the high-level characteristics to further improve the detection result of the target graph.

Figure 4:
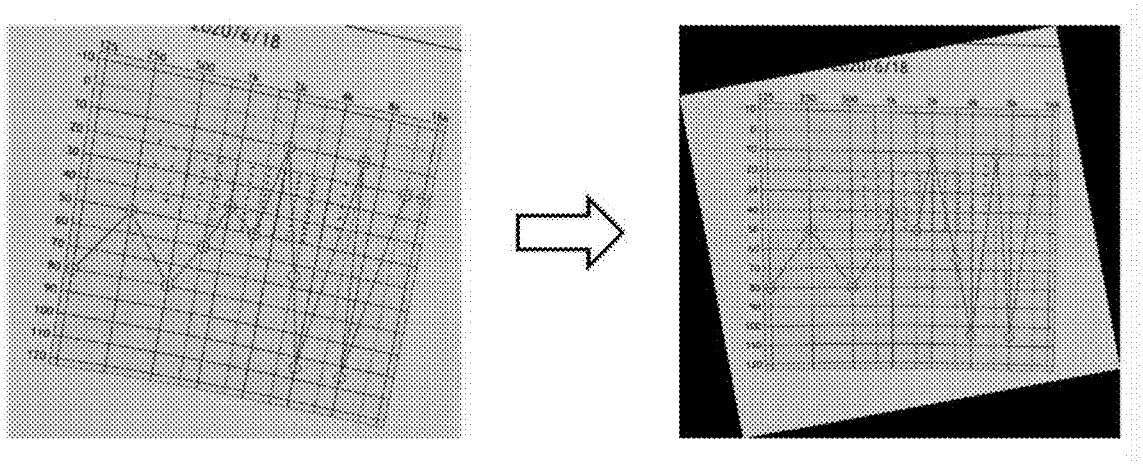
FIG. 4*a* shows an example of a chart area containing an audiogram extracted from an object image.
FIG. 4*b* shows the chart area after deflection correction processing.

FIG. 4*a* shows an example of a chart area containing an audiogram extracted from an object image. It can be seen that the background part in the object image has basically been removed, so the subsequent processing only needs to process the chart area, which can improve the efficiency of subsequent processing. It can also be seen from FIG. 4*a* that, in some cases, due to the problem of the object image itself, an orientation of the audiogram may be at a certain angle to the edge of the chart area. In other words, the recognized audiogram through step 204 has a certain deflection angle relative to the edge of the extracted chart area. The existence of the deflection angle would affect the subsequent processing of the audiogram. Therefore, in some embodiments, after the chart area containing the audiogram is obtained, deflection angle correction can be continued. For example, a plurality of straight lines parallel to the coordinate axis in the audiogram can be used to orient the audiogram. In a preferred embodiment, the Hough line detection method can be used to detect one or more straight lines in the audiogram to obtain the deflection angles of these straight lines.

Specifically, the Hough line detection method can transform an image into a parameter space. When the Hough line detection method is used to process an image, a point in the image is mapped to a curve in a parameter space, and a straight line in the image is mapped to a point in the parameter space. In the image, the points on the same straight line correspond to a curve cluster that intersect at one point in the parameter space, and the intersection point is the straight line in the image. Since most of the straight lines in the audiogram are parallel to one of the two coordinate axes, a mode of the Hough transform parameters corresponding to a slope of the straight line in the audiogram is an angle to be rotated of the audiogram. Preferably, non-maximum value suppression can be performed after the Hough transform that transforms the image into the parameter space, and the straight line with higher confidence in the parameter space is retained.

After the straight line with higher confidence is determined, the chart area can be rotated based on the angle to be rotated between the coordinate axis it represents and the edge of the chart area, so as to compensate for the original deflection angle of the audiogram in the chart area. FIG. 4*b* shows a chart area after deflection correction processing. It can be seen that a certain pixel filling is performed outside the original chart area, so that the edges of the corrected chart area are generally parallel to the coordinate axes of the audiogram. For the operators, they can observe that, after rotation of the audiogram, one coordinate axis in the audiogram extends approximately in the horizontal direction, and the other coordinate axis in the audiogram extends approximately in the vertical direction, as shown in FIG. 4*b*.

It can be understood that, in some embodiments, the subsequent steps may be directly performed without rotating the chart area, or other processing may be performed on the chart area, such as image distortion correction processing.

Figure 5:
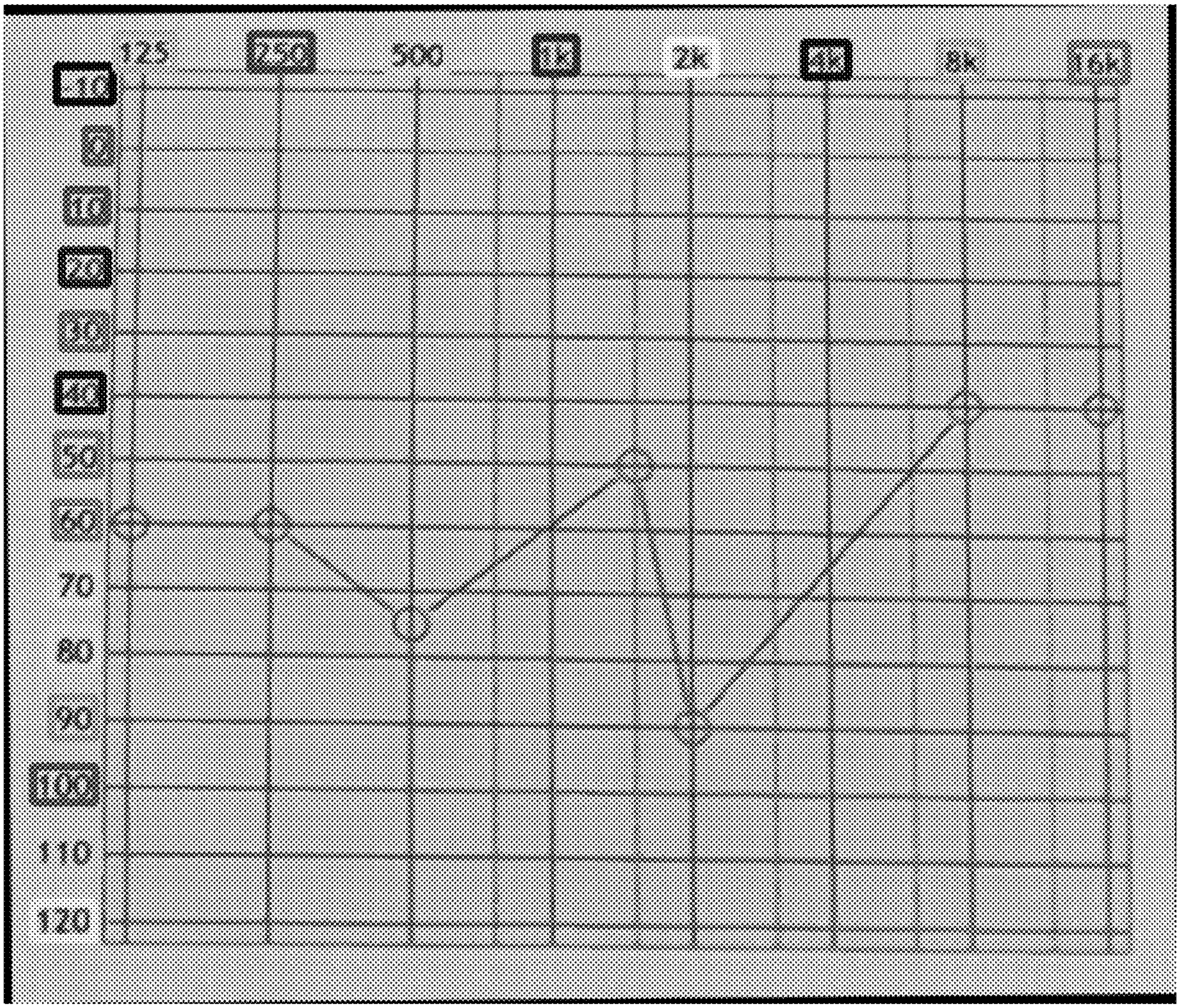
FIG. 5 shows an audiogram recognized from the object image shown in FIG. 3.

FIG. 5 shows an audiogram (the audiogram on the left) recognized from the object image shown in FIG. 3. As shown in FIG. 5, the audiogram includes a labeled area defined by a first coordinate axis and a second coordinate axis that intersect with each other, wherein the first coordinate axis is a coordinate axis extending in the horizontal direction, and the second coordinate axis is a coordinate axis extending in the vertical direction. The labeled area generally includes a rectangular area with the first coordinate axis and the second coordinate axis as two sides of the labelled area. In this audiogram, the first coordinate axis represents sound frequency, and there are a plurality of first coordinate axis labels marked along the first coordinate axis, such as 125, 250, 500, 1k, 2k, 4k, 8k, and 16k. The second coordinate axis represents loudness of sound, and there are a plurality of second coordinate axis labels marked along the second coordinate axis, such as −10, 0, 10, 20, 30, 40, 50, 60, 70, 80, 90, 100, 110, and 120. In FIG. 5, the coordinate axis labels are labeled with boxes of different sizes. These boxes are not part of the original object image, but are added additionally for the convenience of presenting the coordinate labels. In addition, the audiogram also includes a plurality of characteristic labels located in the labeled area, and these characteristic labels are connected by a hearing curve, wherein a line segment is connected between every two adjacent characteristic labels.

Still referring to FIG. 2, in step 206, a trained second neural network may be used to process the chart to recognize a plurality of first coordinate axis labels, a plurality of second coordinate axis labels, and characteristic labels.

Specifically, after obtaining the chart area with the audiogram therein, the information in the audiogram can be processed. First, the position and direction of the coordinate axis can be detected. Since the coordinate axis is close to the coordinate axis labels distributed thereon, the position and direction of the coordinate axis can usually be fitted according to the coordinate axis labels on the coordinate axis. Therefore, the coordinate axis labels can be recognized first when the chart is processed.

For standard charts such as audiograms, the coordinate axis labels on the coordinate axes are generally fixed numbers. Therefore, target detection can be performed based on a limited number of coordinate axis labels of a plurality of fixed types used in the chart to determine the coordinate axis positions. In some embodiments, the second neural network may use a neural network with the same algorithm or model that the first neural network used in chart detection in step 204, for example, using Faster RCNN in combination with FPN model. The specific structure of these models will not be repeated here. The second neural network usually also needs to be trained by a specific data set, so that it has the ability to recognize coordinate axis labels and characteristic labels.

In some embodiments, a training data set may be constructed in advance to train the second neural network. For example, the training data set can be constructed in the following way.

First of all, various standard or non-standard labels can be used to generate synthetic training data sets. The reason using the label library to generate the synthetic training data set is that the audiogram is printed, and the coordinate axis labels in the audiogram are also generated by some commonly used label libraries. Therefore, after various coordinate axis labels are generated in advance based on the label library, the corresponding relationship between the numbers and the coordinate axis labels can be directly obtained, and in practical applications, it is possible to generate coordinate axis labels in various required formats in batches without manually labeling the coordinate axis labels in the actual audiogram, which can reduce the processing complexity. Specifically, labels for various coordinate axis labels (including a variety of different fonts, different rotational angles, different sizes, etc.) can be generated first. Preferably, some common interference fonts (also including a variety of different fonts, different rotational angles, different sizes, etc.) can be generated at the same time, and these interference fonts can also be used as part of the synthetic training data set. Adding interference fonts in the synthetic training data set can enhance the ability of the second neural network to distinguish the required coordinate axis labels from the interference irrelevant characteristic labels.

Figure 6:
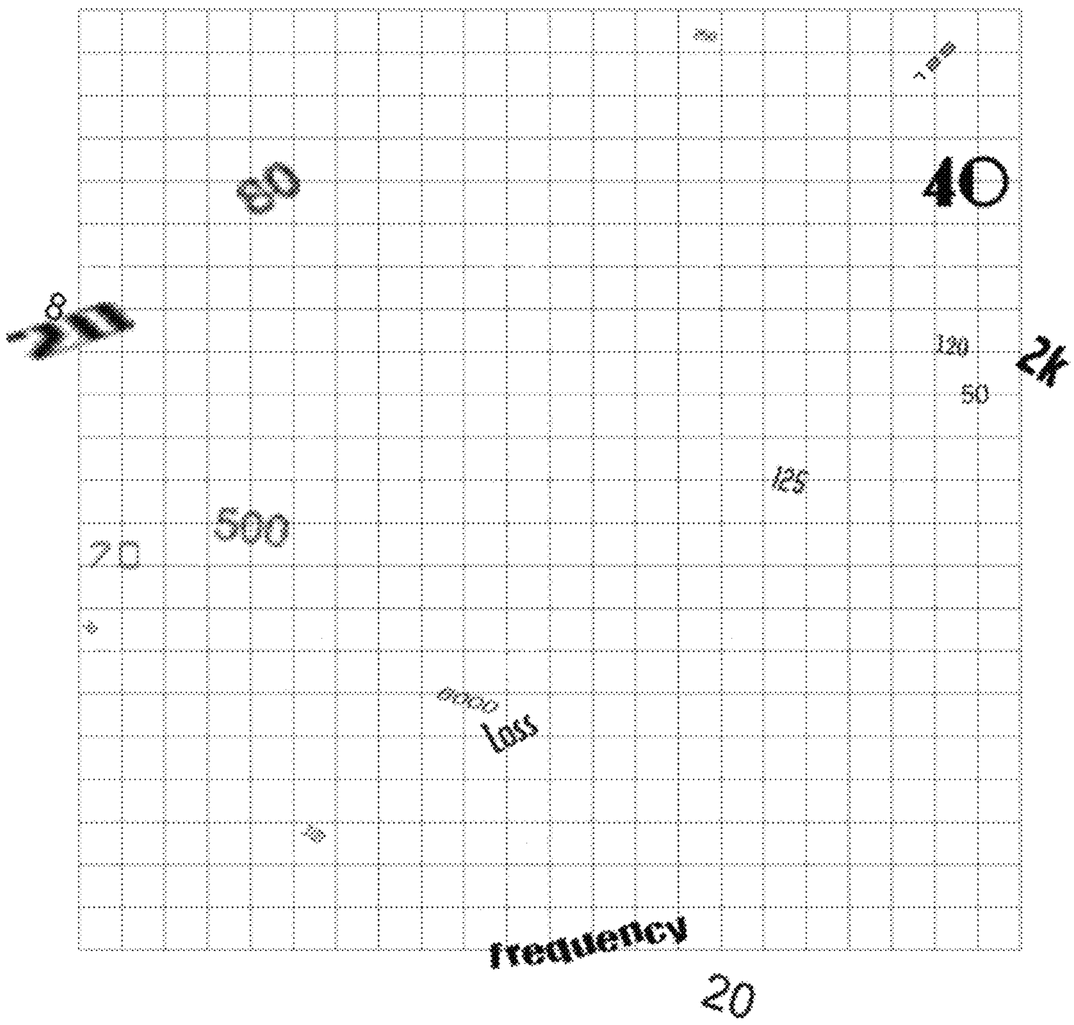
FIG. 6 shows a background image superimposed with labels.

Afterwards, some relatively random backgrounds (mainly charts, solid color paper (such as white paper or gray paper), etc.) can be generated, and the previously generated fonts can be superimposed on the background at random positions. FIG. 6 shows a composite audiogram superimposed with labels. It can be seen that interference labels such as “8” and “6000” can also be superimposed on the background image, and various coordinate axis labels that need to be recognized are also superimposed on the background image, such as “20”, “80”, “500”, “2k” and so on. In some cases, some textures or wrinkles can be added to the synthetic audiogram to simulate the actual audiogram being folded by the patient. When training the second neural network, combined with synthetic audiograms, these previously generated fonts can improve the accuracy of the second neural network obtained by training. In some embodiments, a large number of synthetic audiograms (for example, tens, hundreds, thousands, or more images) can be generated as part of the synthetic training data set.

Through the above means, a large number of synthetic training data sets containing coordinate axis labels can be generated, and no time-consuming manual labeling is required. Not only does this effectively solve the problem of lack of data due to the high cost of labeling, it also enables the trained neural network to have good recognition capabilities for recognizing various fonts, various sizes, and various angles, thus further improving the accuracy of recognition of coordinate axis labels.

It can be understood that although there are relatively few types of characteristic labels, training data related to characteristic labels can also be similarly generated and be used to train the second neural network, which is not elaborated herein.

After the processing by the second neural network, the coordinate axis labels and characteristic labels and their respective positions in the audiogram can be determined. In some embodiments, a left ear air conduction characteristic label or left ear bone conduction characteristic label representing left ear hearing, and a right ear air conduction characteristic label or right ear bone conduction characteristic label representing right ear hearing can both be determined. In some other embodiments, the characteristic labels further include a left ear characteristic label representing left ear hearing and a right ear characteristic label representing right ear hearing. Referring to FIG. 5, the coordinate axis labels are labeled with different boxes.

In some embodiments, the first coordinate axis label and the second coordinate axis label can be detected using different sub-modules. These two sub-modules generally have the same algorithm and function, but the data sets for training the two sub-modules may not be exactly the same. For example, the abscissa axis labels mainly include 125, 250, 500, 1k, 2k, 4k, 8k, 16k, etc., while the ordinate axis labels mainly include −10, 0, 10, 20, 30, 40, 50, 60, 70, 80, 90, 100, 110, 120, etc. It should be noted that, since the labels that need to be recognized in the standard audiogram are mainly the above-mentioned labels, other numbers or characters usually do not need to be recognized, so the use of neural network technology to recognize such labels has a higher accuracy. In addition, when the neural network is used to recognize the coordinate axis labels, these coordinate axis labels themselves are considered as some image labels, and there is no need to recognize them as characters or numbers, which can save processing resources.

In particular, referring to FIG. 5, the ordinate axis labels are distributed in a longitudinal direction, but are not distributed along the horizontal line. For other text recognition methods, such as optical character recognition (OCR), the recognition accuracy of longitudinally distributed labels is poor. In addition, the OCR method can recognize far more character categories than those required by standard-format charts such as audiograms, but this consumes considerable processing resources, which is undesired for recognizing standard charts such as audiograms. Therefore, the neural network used in the embodiments of the present application directly recognizes a limited number of coordinate axis labels. Specifically, 22 candidate numbers (125 to 16k, −10 to 120) can be used as the foreground, and all other areas can be used as the background for training and testing.

It can be understood that, similar to the first neural network, some parts of the second neural network model can also be replaced with an algorithm structure that can achieve the same purpose. For example, the classification structure can be replaced by a support vector machine (SVM). In addition, other common target detection models can be used, such as Fast-RCNN and YOLO.

Next, in step 208, based on the recognized plurality of first coordinate axis labels and plurality of second coordinate axis labels, a chart coordinate system is generated, where the chart coordinate system is used to fit the first coordinate axis and the second coordinate axis. Specifically, after obtaining the positions of the coordinate axis labels, a robust fitting method can be used to fit the coordinate axis using the coordinate axis labels. Robust fitting method can reduce the influence of coordinate axis label detection error.

In some embodiments, the robust fitting method may be the Huber regression fitting method, and the objective function Obj(a) of the method is given by the following equation (1).

$$Obj(a) = \begin{cases} \frac{1}{2}a^2 & \text{for } |a| \le \delta, \\ \delta\left(|a| - \frac{1}{2}\delta\right) & \text{Others} \end{cases} \quad \text{Equation (1)}$$

Figure 7:
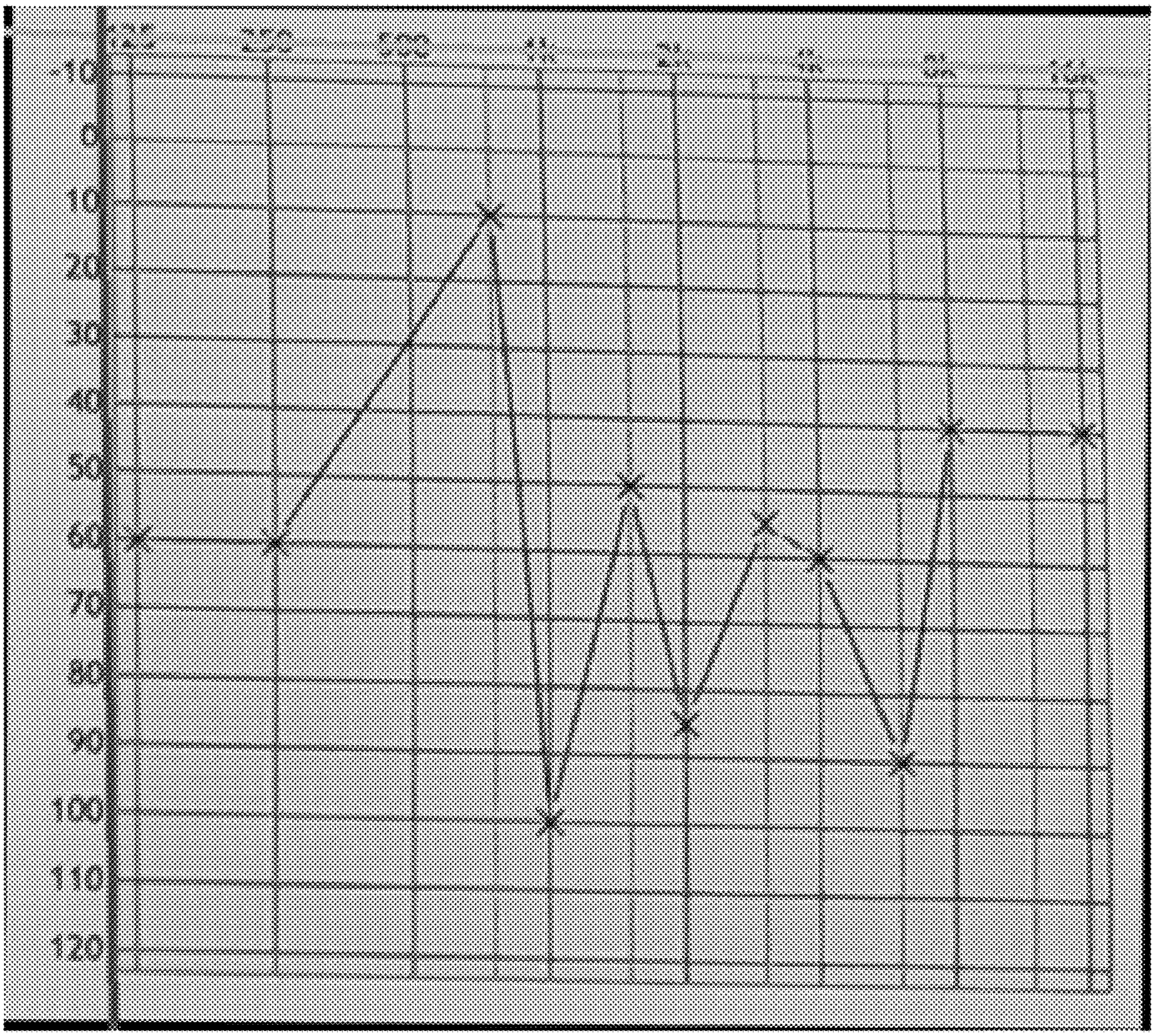
FIG. 7 shows two mutually perpendicular coordinate axes based on coordinate axis labels fitting.

Compared with the traditional linear regression method that uses the mean square error as the objective function and is sensitive to outliers, the Huber regression fitting method uses the absolute value error as the objective function when the data is abnormal, which has a better ability to suppress outliers. For example, the audiogram or other similar standard-format charts shown in FIG. 5, the two coordinate axes thereon are similar to two straight lines, and should not be deflected sharply. Therefore, the Huber regression fitting method can suppress the outliers that may appear due to inaccurate coordinate point detection, which greatly improves the robustness of the system. FIG. 7 shows two mutually perpendicular coordinate axes based on the coordinate axis label fitting. It can be seen that the ordinate axis generally passes through each ordinate axis label, and the abscissa axis generally passes through all the abscissa labels, and the orientations of the two coordinate axes obtained by fitting are generally the same as those of the original coordinate axes in the audiogram.

Other methods can also be used to fit either of the coordinate axis. For example, the random sample and consensus (RANSAC) algorithm can be used to perform coordinate axis fitting. The RANSAC algorithm is also a robust fitting method. It divides the data into in-group points and outlying points; and in an iterative way, it continuously selects some data points in the data for fitting randomly, and retains the model with the most in-group points as the final result.

FIGS. **8*a*-8*c*** show a process of using the RANSAC algorithm to perform coordinate axis fitting. In this process, a plurality of coordinate axis labels are spatially and numerically fitted twice, so as to obtain the fitted coordinate axis.

Figure 8A:
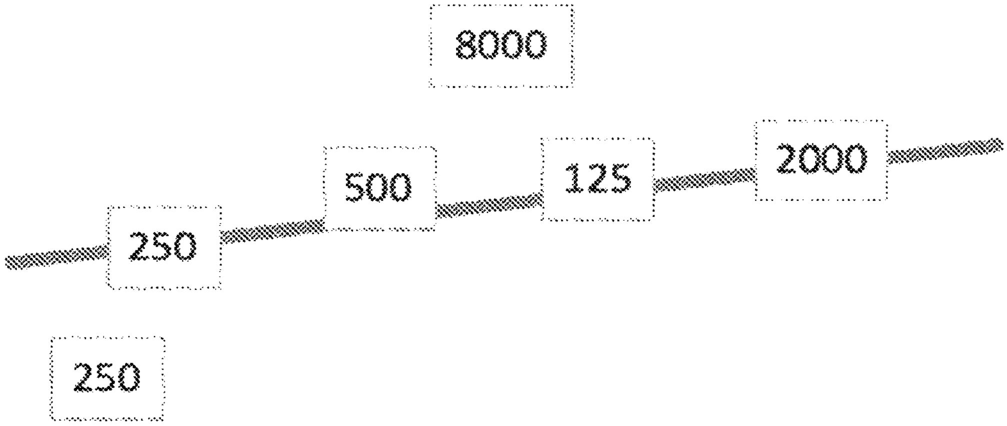
FIG. 8*a*-8*c* show the process of using the RANSAC algorithm to perform coordinate axis fitting.
Figure 8B:
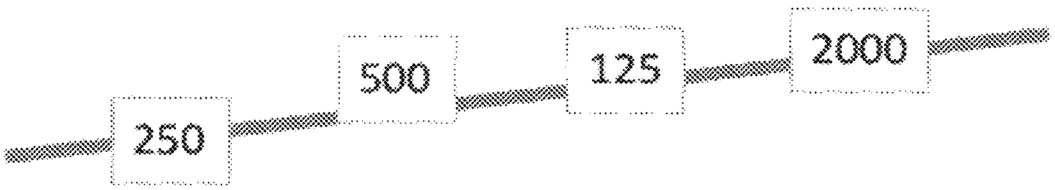

As shown in FIG. 8*a*, first of all, abscissa values of the detected coordinate axis labels are used as independent variables, and ordinate values of these coordinate axis labels are used as dependent variable. Then, the RANSAC algorithm can be used to perform linear regression fitting to obtain a straight line that can best fit the coordinate axis labels. Then, as shown in FIG. 8*b*, based on the straight line shown in FIG. 8*a* obtained by the first fitting, the coordinate axis labels belonging to the in-group in the previously detected coordinate axis labels are retained, and the coordinate axes belonging to the outlier labels are removed. That is, the lower coordinate axis label 250 and the coordinate axis label 8000 in FIG. 8*a* are removed. The purpose of fitting using the RANSAC algorithm for the first time is to spatially remove outliers, that is, to eliminate the influence of the mis-detected axis labels during the coordinate axis label detection process. For example, among two labels recognized together as the coordinate axis label 250, the label that is closer to the fitting straight line is retained, and the other label is removed. It can be seen that in the first fitting, it does not consider whether the coordinate axis labels are classified correctly.

Figure 8C:
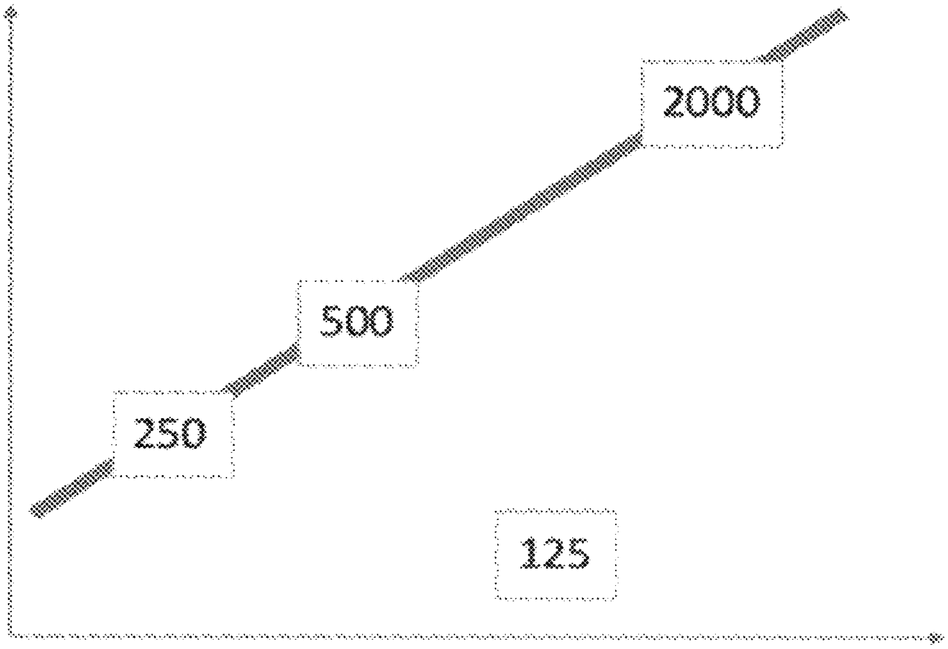

Then, as shown in FIG. 8*c*, the remaining coordinate axis labels are projected onto the straight line fitted in FIG. 8*b*, and the abscissa values are used as the independent variables. Two coordinate axes can be determined based on these coordinate axis labels and the fitted straight line, that is, the abscissa axis representing frequency value and the ordinate axis representing hearing loss. Specifically, when fitting and determining the abscissa axis, the abscissa values of these projected axis labels can be used as the dependent variables, and then the RANSAC algorithm is used to perform linear regression fitting on the independent variables and the dependent variables, so as to obtain a straight line that can best fit these coordinate axis labels numerically (as shown in FIG. 8*c*, the fitting values of coordinate axis label 125 and other coordinate axis labels are quite different, so it can be considered as an outlier point and removed). In this way, the straight line is the abscissa axis obtained after fitting. Similarly, when determining the abscissa axis by fitting, the abscissa values (such as 125, 250, 500, etc.) of these projected axis labels can be taken logarithmically as the dependent variables (because the frequency values in the audiogram are in logarithmic coordinates). Then the RANSAC algorithm can be used to perform linear regression fitting on the independent variables and the dependent variables, so as to obtain a straight line that can best fit the coordinate axis labels (the vertical coordinate in FIG. 8*c*). In this way, the straight line is the ordinate axis obtained after fitting. It can be seen that the purpose of the processing by the second RANSAC algorithm is to remove outliers in the numerical domain, that is, to eliminate the influence of misclassification of labels in the process of coordinate axis label detection. In this way, using the RANSAC algorithm twice in the coordinate axis fitting process can make it possible to correctly fit the coordinate axis even when the coordinate axis label detection is inaccurate, which greatly improves the stability and reliability of the system.

It can be understood that after obtaining the straight lines corresponding to the two coordinate axes by fitting, the coordinate axis labels recognized in step 206 can be combined with each other to generate the chart coordinate system, so that the frequency value or loudness value corresponding to each length of the abscissa axis or the ordinate axis is determined. In some embodiments, it is also possible to generate fitting coordinate lines (not shown in the figures) similar to the respective abscissa and ordinate lines that intersect with each other in the original audiogram in the chart coordinate system.

Next, in step 210, coordinate values of each characteristic labels can be determined based on an identified position of the characteristic label in the chart coordinate system.

After the positions of the coordinate axes and the positions of the characteristic labels are determined, each characteristic label can be projected onto the two coordinate axes determined in step 208 to determine the coordinate values of the characteristic label on the two coordinate axes. In the embodiment of the present application, the slope of the coordinate axis obtained by fitting can be used to calculate an equation of a straight line parallel to the coordinate axis passing through the characteristic label, and to obtain the position of the intersection point of the straight line with each of the coordinate axes. Finally, it can be determined that the coordinate closest to the intersection point on the coordinate axis corresponds to the coordinate value of the characteristic label on the coordinate axis.

Figure 9:
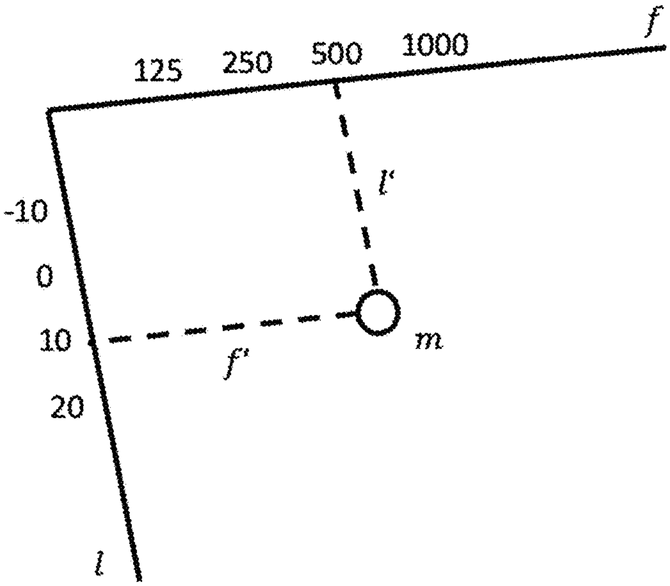
FIG. 9 shows a method of projecting and calculating the coordinate values of a characteristic label.

Referring to FIG. 9, a method for projecting and calculating coordinate values of a characteristic label is shown, and the method is suitable for fitting a determined coordinate axis by using the Huber algorithm, for example. Specifically, assuming that the expressions of the two coordinate axes are $y=k_1x+b_1$ and $y=k_2x+b_2$, respectively, a straight line f' parallel to the frequency coordinate axis f through the characteristic label m can be given by an equation: $y=k_1x+y_m-k_1x_m$. Similarly, a straight line l' passing through the characteristic label m and parallel to the loudness coordinate axis l can be given by an equation $y=k_2x+y_m-k_2x_m$. Then, the projection of the characteristic label m on the frequency coordinate axis f can be obtained, that is, the coordinate of the intersection of the straight line l' and the straight line f is $$\left(\frac{y_m - k_2x_m - b_1}{k_1 - k_2}, \frac{k_1y_m - k_1k_2x_m - k_2b_1}{k_1 - k_2}\right).$$

In some embodiments, respective distances between the above-mentioned intersection points and each frequency axis label can be compared, and the frequency axis label corresponding to the shortest distance is the frequency of the characteristic label m, because the hearing test is performed under the standard frequencies. Similarly, the projection of the characteristic label m on the loudness coordinate axis l can be obtained, that is, the coordinate of the intersection point of the straight line f' and the straight line l is $$\left(\frac{y_m - k_1x_m - b_2}{k_2 - k_1}, \frac{k_2y_m - k_1k_2x_m - k_1b_2}{k_2 - k_1}\right).$$

In some embodiments, the distance between the respective intersection points and each loudness axis label may be compared, and the loudness axis label corresponding to the shortest distance may be determined as the loudness of the characteristic label m. In other embodiments, the loudness of the characteristic label m may be calculated proportionally based on the respective distances between the loudness coordinate axis labels and the intersection point, or the respective distances between at least two adjacent loudness coordinate axis labels and the intersection point. Therefore, using the above method, the frequency and loudness corresponding to each characteristic label can be calculated, and the audiogram can be completed.

In other embodiments, other means may be used to determine the coordinate values of the characteristic labels. For an embodiment that uses two RANSAC algorithm fittings as shown in FIGS. 8*a*-8*c* to determine the coordinate axes, the straight line obtained by the characteristic label fitting can be determined. Therefore, the fitted straight lines can be used to determine the coordinate values of the characteristic labels. Specifically, in this case, after obtaining the projection of a characteristic label onto each coordinate axis, that is, after obtaining the coordinates of the intersection point between the straight line l' and the straight line f in FIG. 9 (or the intersection point between the straight line f' and the straight line l), the abscissa or ordinate of the intersection point can be taken as the independent variable into the fitted straight line, and the value of the corresponding dependent variable (ordinate or abscissa) can be obtained. After that, the calculated value of the dependent variable can be compared with the absolute value of the difference between each candidate coordinate axis label value and the calculated value, and the coordinate axis label value corresponding to the smallest difference can be selected as the determined coordinate value.

Figure 10:
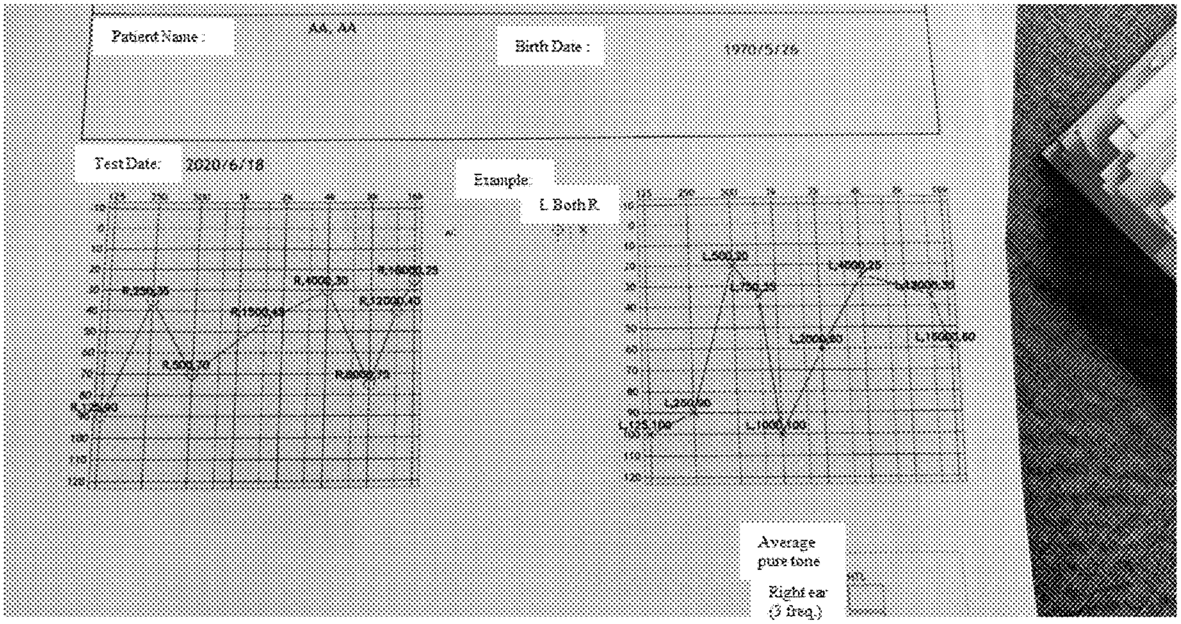
FIG. 10 shows an object image in combination with coordinate values.

In some embodiments, the coordinate values of the characteristic labels can be combined with the object image to facilitate observation by the operator. FIG. 10 shows an object image combined with coordinate values. Among them, each characteristic label is associated with a coordinate value, and the coordinate value also includes the information that the characteristic label represents the left ear or the right ear (R stands for left ear, L stands for right ear). In this way, the physician or audiologist can input these values directly into the hearing aid. In other embodiments, an electronic device used to perform chart recognition can store the coordinate values of the characteristic labels for subsequent use. For example, these stored coordinate values can be directly written into the hearing aid to customize the hearing aid to adapt to the patient.

The chart recognition method of the present application can accurately and efficiently recognize charts such as audiograms, has strong robustness, and can cover most application scenarios. This application can also effectively promote the automated fitting of hearing aids, bringing convenience to the majority of patients.

The embodiments of the present invention may be implemented by hardware, software, or a combination of software and hardware. The hardware part can be implemented using dedicated logic; the software part can be stored in a memory and executed by an appropriate instruction execution system, such as a microprocessor or dedicated design hardware. Those skilled in the art can understand that the above-mentioned devices and methods can be implemented using computer-executable instructions and/or included in processor control codes, for example, such codes are provided on a carrier medium such as a disk, CD or DVD-ROM, on a programmable memory such as a read-only memory (firmware) or on a data carrier such as an optical or an electronic signal carrier provide such codes. The device and modules thereof of the present invention can be implemented by hardware circuits such as very large scale integrated circuits or gate arrays, semiconductors such as logic chips, transistors, etc., or programmable hardware devices such as field programmable gate arrays, programmable logic devices, etc. It can also be implemented by software executed by various types of processors. It can also be implemented by a combination of the above-mentioned hardware circuit and software, such as firmware.

It should be noted that although several steps or modules of the method, device, and storage medium for recognizing the chart are mentioned in the above detailed description, this division is only exemplary and not mandatory. In fact, according to the embodiments of the present application, the features and functions of two or more modules described above can be embodied in one module. In contrary, the features and functions of a module described above can be further divided into multiple modules to be embodied.

Those skilled in the art can understand and implement other changes to the disclosed embodiments by studying the description, the disclosed content, the drawings, and the appended claims. In the claims, the word "comprise" does not exclude other elements and steps, and the word "a" and "an" do not exclude plurals. In the practical application of the present application, one part may perform the functions of multiple technical features cited in the claims. Any reference numerals in the claims should not be construed as limiting the scope.

What is claimed is:

1. A method for recognizing a chart, wherein the method comprises:

acquiring an object image containing a chart, wherein the chart comprises a labeled area defined by a first coordinate axis and a second coordinate axis that intersect with each other, first coordinate labels along the first coordinate axis, second coordinate labels along the second coordinate axis, and a plurality of characteristic labels within the labeled area;

processing the object image with a trained first neural network to identify and separate the chart from the object image;

processing the chart with a trained second neural network to identify the first coordinate labels, the second coordinate labels and the plurality of characteristic labels;

generating a chart coordinate system based on the identified first coordinate labels and second coordinate labels, wherein the chart coordinate system fits the first coordinate axis and the second coordinate axis of the object image; and determining coordinate values of each of the plurality of characteristic labels based on an identified position of the characteristic label in the chart coordinate system.

2. The method of claim 1, wherein, after the step of processing the object image with the trained first neural network, the method further comprises:

rotating the chart to extend the first coordinate axis generally in a horizontal direction and the second coordinate axis generally in a vertical direction.

3. The method of claim 2, wherein the step of rotating the chart further comprises:

determining a first angle to be rotated for the first coordinate axis and a second angle to be rotated for the second coordinate axis using Hough straight line transformation method; and rotating the first coordinate axis and the second coordinate axis based on the determined first and second angles to be rotated.

4. The method of claim 1, wherein the trained first neural network and the trained second neural network are trained with different data sets.

5. The method of claim 4, wherein the first neural network and the second neural network use the same neural network algorithm.

6. The method of claim 5, wherein the first neural network and the second neural network both use faster region based convolutional neural network (RCNN) algorithm in combination with feature pyramid network (FPN) algorithm.

7. The method of claim 1, wherein the second neural network is trained with a synthetized training data set, and the synthetized training data set comprises a plurality of synthetized audiograms each including a background image and coordinate labels superimposed on the background image, and wherein the coordinate labels are generated based on one or more character libraries.

8. The method of claim 7, wherein the synthetized audiogram further comprises interference labels superimposed on the background image.

9. The method of claim 1, wherein the step of generating a chart coordinate system based on the identified first coordinate labels and second coordinate labels further comprises:

using Huber regression algorithm to fit the chart coordinate system to the first coordinate axis and the second coordinate axis.

10. The method of claim 1, wherein the step of generating a chart coordinate system based on the identified first coordinate labels and second coordinate labels further comprises:

using random sample and consensus (RANSAC) algorithm to spatially fit the chart coordinate system to the first coordinate labels and to the second coordinate labels respectively; and using RANSAC algorithm to numerically fit at least a part of the first coordinate labels and to at least a part of the second coordinate labels so as to generate the first coordinate axis and the second coordinate axis.

11. The method of claim 1, wherein the step of determining coordinate values of each of the plurality of characteristic labels based on an identified position of the characteristic label in the chart coordinate system comprises:

projecting each of the characteristic labels onto the first coordinate axis to determine a first coordinate value of the characteristic label;

projecting each of the characteristic labels onto the second coordinate axis to determine a second coordinate value of the characteristic label; and combining the first coordinate value and the second coordinate value for each characteristic label.

12. The method of claim 1, wherein the chart is an audiogram, the first coordinate axis represents sound frequency, the second coordinate axis represents loudness of sound, the first coordinate axis labels are frequency values, and the second coordinate axis labels are loudness values, and the coordinate values of each characteristic label has a pair of frequency value and loudness value.

13. The method of claim 12, wherein the characteristic labels further comprise left ear characteristic labels each representing left ear hearing and right ear characteristic labels each representing right ear hearing.

14. The method of claim 12, wherein the characteristic labels further comprise left ear air conduction characteristic labels or left ear bone conduction characteristic labels each representing left ear hearing, and right ear air conduction characteristic labels or right ear bone conduction characteristic labels each representing right ear hearing.

15. A device for recognizing a chart, wherein the device comprises a non-transitory computer storage medium on which one or more executable instructions are stored, and the one or more instructions are executable by a processor to perform the following steps:

acquiring an object image containing a chart, wherein the chart comprises a labeled area defined by a first coordinate axis and a second coordinate axis that intersect with each other, first coordinate labels along the first coordinate axis, second coordinate labels along the second coordinate axis, and a plurality of characteristic labels within the labeled area;

processing the object image with a trained first neural network to identify and separate the chart from the object image;

processing the chart with a trained second neural network to identify the first coordinate labels, the second coordinate labels and the plurality of characteristic labels;

generating a chart coordinate system based on the identified first coordinate labels and second coordinate labels, wherein the chart coordinate system fits the first coordinate axis and the second coordinate axis of the object image;

determining coordinate values of each of the plurality of characteristic labels based on an identified position of the characteristic label in the chart coordinate system.

16. A non-transitory computer storage medium, wherein one or more executable instructions are stored thereon, and the one or more executable instructions are executed by a processor to perform a method for identifying a chart, and wherein the method comprises the following steps:

acquiring an object image containing a chart, wherein the chart comprises a labeled area defined by a first coordinate axis and a second coordinate axis that intersect with each other, first coordinate labels along the first coordinate axis, second coordinate labels along the second coordinate axis, and a plurality of characteristic labels within the labeled area;

processing the object image with a trained first neural network to identify and separate the chart from the object image;

processing the chart with a trained second neural network to identify the first coordinate labels, the second coordinate labels and the plurality of characteristic labels;

generating a chart coordinate system based on the identified first coordinate labels and second coordinate labels, wherein the chart coordinate system fits the first coordinate axis and the second coordinate axis of the object image;

determining coordinate values of each of the plurality of characteristic labels based on an identified position of the characteristic label in the chart coordinate system.

* * * * *